Patented Aug. 8, 1933

1,921,676

UNITED STATES PATENT OFFICE 1,921,676

DETERGENT COMPOSITION OF MATTER

Maxwell M. Kahn, Belleville, N. J.

No Drawing. Application March 7, 1930
Serial No. 434,160

5 Claims. (Cl. 167—91)

The present invention relates to a cleansing and massaging mixture which employs for its base, a gummy substance dispersed in liquid phase as rubber latex or the like either as found in its natural state or as produced by synthesis.

With massage and cleansing creams at present used for skin treatment the same usually consist of some skin penetrating oleaginous material such as rectified petroleum, or white soap mixed with a base of non-penetrating material such as moist casein which when rubbed over the skin and after the penetrating material has entered the skin, forms little rolls of solid material and tends to roll out the dirt in the skin and massage the latter at the same time. Such cleansing and massaging creams however have first, the defect of decomposibility which necessitates the use of preservatives in the cream and secondly the surface effect of the solid material formed is comparatively small and the creams are hence inefficient as massaging agents.

The primary object of the present invention is to produce a massaging or cleansing agent which is free of the above objections and which is vastly more efficient in its action, forming a large amount of solid massaging and rolling material.

A further object is to employ a base which is harmless in its nature and which will not decompose.

My composition comprises primarily a base of a gummy substance dispersed in liquid phase (water medium) as rubber latex or the like, and obtained either in natural form as it comes from the plants or else from artificial manufacture thereof. To this base may be added any one of the various creams such as vanishing creams, which usually contain white soap, water, glycerine and perfume; or cold cream containing glycerine, water, sodium or potassium stearate and perfume; or cleansing creams which may contain rectified petroleum oil emulsified in agar-agar or Irish moss and perfumed to suit. In fact any one of the known creams or other products of similar nature may be mixed with the said base, of course, in the right proportions.

The specific mixtures following are merely cited by way of example and it is not intended that I limit myself in any way to the particular uses or material.

Example 1.—I mix and stir until the proper texture is obtained, two parts by volume of dispersed rubber in liquid phase containing approximately 35% rubber and 65% water by weight at room temperature, with approximately 5½ parts by volume of a cold cream containing a mixture of potassium stearate, glycerine and water and perfume. Care must be taken to maintain the slightly alkaline nature of the mixture and also the quantity of glycerine in the mixture must be carefuly watched to prevent coagulation of the dispersed rubber. The product is a combination cold cream and massage cream which when rubbed into the skin will first smoothly spread thereover and as the cream penetrates and the water evaporates the dispersed rubber will begin to form into little lumps or nodules which roll over the skin effectively massaging the latter and rolling out dirt therefrom. The glycerine helps to smooth out the texture of the mixture.

Example 2.—I take the dispersed rubber in liquid phase (water medium) at room temperature and add a vanishing cream thereto and beat the mixture together adding vanishing cream until the desired texture is obtained. The mixture must be kept slightly alkaline, else the rubber coagulates. The massaging effect of the cream occurs by voluminous formation of the lumps or nodules of rubber when the vanishing cream has penetrated the skin and the water evaporated from said dispersed rubber.

Example 3.—I mix dispersed rubber in liquid phase (water medium) with rectified petroleum oil emulsified in agar-agar or Irish moss and beat the mixture and add said emulsified oil until the desired texture is obtained. A cleansing cream is the result in which no casein is used.

Example 4.—I mix dispersed rubber in liquid phase (water medium) with liquid or semi-solid soap, beat the mixture and add soap until desired texture is obtained. A rubbing soap is formed which may be used without water if desired.

Example 5.—At room temperature take approximately 5 parts by volume of a vanishing cream having substantially the proportions of 39 grammes of stearic acid, 5½ grammes of potassium carbonate, 165 grammes of water and 75 cubic centimeters of glycerine, and add the said cream to 2 parts by volume of water, add the said mixture gradually to 2 parts by volume of rubber latex containing approximately 35% rubber and 65% water by weight, and beat while adding said mixture to the latex. A smooth effective cleansing cream is obtained.

It is obvious that many other cleansing and rubbing mixtures employing my base may be employed and that its uses are not limited to cleansing of skin but may be used for countless other purposes where a combination cleansing and rubbing action is desired.

What I claim is:—

1. A cleansing and massaging cream for the skin comprising a mixture containing substantially 2 parts by volume of rubber latex dispersed in liquid phase and 5 parts by volume of a vanishing cream, the latter containing stearic acid, potassium carbonate and glycerine, and an alkali in sufficient quantity to keep the mixture alkaline, whereby, while said latex retains its coagulative property it is prevented from coagulating until evaporation of the dispersing medium of the latex occurs.

2. A cleansing and massaging cream for the skin comprising a mixture containing substantially 2 parts by volume of rubber latex dispersed in liquid phase, 2 parts by volume of water and 5 parts by volume of a vanishing cream, the latter being formed from a mixture in substantially the proportion of 39 grammes of stearic acid, 5½ grammes of potassium carbonate, 165 grammes of water and 75 cubic centimeters of glycerine and an alkali in sufficient quantity to keep the mixture slightly alkaline, whereby, while said latex retains its coagulative properties, it is prevented from coagulating until evaporation of the dispersing medium of the latex occurs.

3. A detergent composition of matter comprising a mixture of rubber latex dispersed in liquid phase and a metallic salt of a higher fatty acid and a sufficient quantity of alkali to keep the mixture alkaline, whereby, while said latex retains its coagulative property in said mixture it is prevented from coagulating until evaporation of the dispersing medium of the latex occurs.

4. A detergent composition of matter comprising a mixture of rubber latex dispersed in liquid phase and vanishing cream and a sufficient quantity of alkali to keep the mixture alkaline, whereby, while said latex retains its coagulative property in said mixture, it is prevented from coagulating until evaporation of the dispersing medium of the latex occurs.

5. A detergent composition of matter comprising a mixture of rubber latex dispersed in liquid phase and soap, and a sufficient quantity of alkali to keep the mixture alkaline, whereby, while said latex retains its coagulative property in said mixture it is prevented from coagulating until evaporation of the dispersing medium of latex occurs.

MAXWELL M. KAHN.